United States Patent
Aden et al.

(10) Patent No.: US 7,577,693 B2
(45) Date of Patent: Aug. 18, 2009

(54) PERFORMING MULTIPLE ACTIONS ON A SPOOL FILE BY ASSIGNING A PARTICULAR ACTION TO BE PERFORMED ON EACH SEGMENT OF THE SPOOL FILE

(75) Inventors: Tim C. Aden, Longmont, CO (US); Patricia A. Godfrey, Boulder, CO (US); Jack B. Klarfeld, Boulder, CO (US); Robert W. Peverley, Louisville, CO (US); Miranda C. Reeves, Longmont, CO (US)

(73) Assignee: InfoPrint Solutions Company LLC, Boulder, CO (US)

(*) Notice: Subject to any disclaimer, the term of this patent is extended or adjusted under 35 U.S.C. 154(b) by 361 days.

(21) Appl. No.: 10/933,663

(22) Filed: Sep. 3, 2004

(65) Prior Publication Data

US 2006/0053119 A1 Mar. 9, 2006

(51) Int. Cl.
*G06F 7/00* (2006.01)
(52) U.S. Cl. .................................................... 707/205
(58) Field of Classification Search ................ 358/1.15, 358/1.13; 715/513; 707/103, 3
See application file for complete search history.

(56) References Cited

U.S. PATENT DOCUMENTS

| | | | | |
|---|---|---|---|---|
| 5,832,500 A | * | 11/1998 | Burrows | 707/103 R |
| 5,946,460 A | | 8/1999 | Hohensee et al. | 395/117 |
| 6,405,251 B1 | | 6/2002 | Bullard et al. | 709/224 |
| 6,515,756 B1 | | 2/2003 | Mastie et al. | 358/1.15 |
| 6,538,760 B1 | | 3/2003 | deBry et al. | 358/1.15 |
| 6,564,263 B1 | | 5/2003 | Bergman et al. | 709/231 |
| 2001/0043352 A1 | * | 11/2001 | Brossman et al. | 358/1.13 |
| 2003/0123084 A1 | * | 7/2003 | Brossman et al. | 358/1.15 |
| 2004/0049738 A1 | * | 3/2004 | Thompson et al. | 715/513 |

OTHER PUBLICATIONS

@riadne Software Ltd., CoolSpools User Guide, Version 2.1.4, Jul. 2002, Cheltenham, England.*
@riadne, Coolspools User Guide, @riadne software ltd, chettenham, england, Jul. 2002.*
"Document Integration® enables Enterprise Content Management," © 2003 ISIS Marketing GmbH, via Internet at http://www.isis-papyrus.com/, printed from Internet: May 18, 2003, 2 pages.
"pDrivers Suite," extream™ Software, via Internet at http://www.extream.com/suites_pdrivers.html, printed from Internet: May 18, 2003, 3 pages.
"ISIS Training Guide 2003," 2003, pp. 1-15.
"Streamweaver: Streamweaver and Mailsort," extream™ Software, via Internet at http://printmonkey.net/dev/coding/read.asp?pid=1&docid=10, printed from Internet: May 18, 2003, 3 pages.
Reinhard Hohensee et al. "Method, Data Structure and Apparatus for Providing Object Level Rendering Control Using Tagged Secondary Resources," Pending U.S. Appl. 09/507,022, filed Feb. 18, 2000, 43 pages.

* cited by examiner

*Primary Examiner*—Charles Rones
*Assistant Examiner*—Dinku W Gebresenbet
(74) *Attorney, Agent, or Firm*—Duft Bornsen & Fishman LLP

(57) ABSTRACT

A method, computer program product and system for performing multiple actions on a single spool file. A Portable Document Format (PDF) server (PDF server is a component of a print server) identifies segments of a spool file by identifying Base Name Group (BNG) commands in the data stream generated by an application. A BNG command may indicate the beginning of a segment of a spool file. Upon identifying a segment of the spool file, the segment may be converted into a PDF file. An action, e.g., electronic mailing, faxing, printing, to be performed on the PDF file may be determined using the attributes of the segment converted into the PDF file. For example, an entry in a database configured to store a command to perform a particular action may be indexed using these segment attributes. In this manner, multiple actions may be performed on different segments of a spool file.

30 Claims, 4 Drawing Sheets

PERFORMING MULTIPLE ACTIONS ON A SPOOL FILE BY ASSIGNING A PARTICULAR ACTION TO BE PERFORMED ON EACH SEGMENT OF THE SPOOL FILE

TECHNICAL FIELD

The present invention relates to the field of presentation systems, and more particularly to assigning a particular action, e.g., e-mail, archive, print, to be performed on each segment, e.g., sub-document, of a spool file thereby allowing multiple actions, e.g., e-mail, fax, print, to be performed on the same spool file.

BACKGROUND INFORMATION

Presentation architectures are provided for representing documents in a data format which is independent of the methods utilized to capture or create those documents. Documents may contain combinations of text, image, graphics, and/or bar code objects in device and resolution independent formats. Documents may also contain fonts, overlays, and other resource objects, which are required at presentation time to present the data properly. Additionally, documents may also contain resource objects, such as a document index and tagging elements supporting the search and navigation of document data for a variety of application purposes. In general, a presentation architecture for presenting documents in printed format employs a presentation data stream comprising a device-independent application data stream and a device-dependent printer data stream.

A data stream is a continuous ordered stream of data elements and objects which conform to a given format. Application programs can generate data streams destined for a presentation service, archive library, or another application program. The Mixed Object Document Content Architecture (MO:DCA) developed by International Business Machines Corporation of Armonk, N.Y. defines a data stream, which may be utilized by applications to describe documents and object envelopes for document interchange and document exchange with other applications and application services. Interchange is the predictable interpretation of shared information in an environment where the characteristics of each process need not be known to all other processes. Exchange is the predictable interpretation of shared information by a family of system processes in an environment where the characteristics of each process may have to be known to all other processes. Documents which are defined in the MO:DCA format may be archived in a database, and later retrieved, viewed, annotated, and printed in local or distributed system environments.

The MO:DCA file format is designed to be used with a printing system known as the "Advanced Function Presentation" (AFP) printing system developed by, and available from, International Business Machines Corporation, Armonk, N.Y. This printing system has a spool to receive and spool the data stream (such as the data stream in the MO:DCA format) generated by an application into a file, commonly referred to as a "spool file." Spooling may refer to converting the print data into codes that a print server may understand. The AFP printing system may further include an intelligent print server which receives the spool file from the spool and uses the references in the data stream to retrieve the stored resources from a resource database.

The spool file may include a print document that includes multiple sub-documents. For example, a telephone company may print all of its telephone bills for a specified week as a single print document. Each telephone bill in the single print document may be thought of as a sub-document which may have to be sent to a particular customer.

The pages (or sub-documents) in a print document may have one or more associated "overlays," which are static templates to which the page information is added. Continuing with the telephone company example, an overlay for the telephone bills may be the background of the telephone bill having the company logo, and columns for listing the telephone numbers called. Overlays typically are stored in the resource library and utilized by the print server, when processing the spool file, to produce the printed document.

The print server may then convert the data stream (the spool file of the single document) to a device specified data stream directed to a printer for producing the printed document. The single print document that includes multiple sub-documents may then be printed by the printer.

Currently, the action that is performed on the document is performed on the entire document including the sub-documents. Continuing with the telephone company example, all the telephone bills are printed out to be mailed to different customers through the United States Postal Service® regardless as to whether the customer prefers to receive the telephone bill in a different manner.

However, it may be desirable to perform different actions on the data stream besides printing out the document in a hard copy format. It may further be desirable to perform different actions on different sub-documents in the single document. For example, it may be desirable to send one of the sub-documents electronically to the appropriate individual. In another example, it may be desirable to fax one of the sub-documents to the appropriate individual. Continuing with the telephone company example, one customer may prefer to receive the telephone bill by fax instead of by mail through the United States Postal Service®. Another customer may prefer to receive the telephone bill by e-mail instead of by mail through the United States Postal Service®.

Therefore, there is a need in the art to perform multiple actions, e.g., fax, e-mail, archive, print in a particular format, on a single spool file.

SUMMARY

The problems outlined above may at least in part be solved in some embodiments by identifying segments or sub-documents of a spool file. Segments of a spool file may be identified by a Portable Document Format (PDF) server (PDF server is a component of the print server) identifying Base Name Group (BNG) commands in the data stream generated by an application. A BNG command may indicate the beginning of a segment or sub-document of a spool file. Upon identifying segments of a spool file, each segment may be converted into a Portable Document Format (PDF) file by the PDF server. The PDF server may determine an action, e.g., electronic mailing, faxing, printing, to be performed on the PDF file by accessing a particular entry in a database using the attributes of the segment (referring to the segment that was converted into the PDF file) where the entry contains a command to perform a particular action. In another embodiment, the PDF server may determine an action, e.g., electronic mailing, faxing, printing, to be performed on the PDF file by calling a user program to supply the PDF server with the appropriate action to be performed on the PDF file. The user program may supply such an action by receiving the attributes of the segment from the PDF server. The user program may use the segment attributes to identify the action to be performed. In this manner, multiple actions, e.g., fax, e-mail, archive, print, may be performed on different segments of a spool file. That is, in this manner, multiple actions may be performed on a single spool file.

In one embodiment of the present invention, a method for performing multiple actions on a single spool file may comprise the step of generating a data stream where the data stream comprises a plurality of commands. The method may further comprise spooling the data stream into a spool file. The method may further comprise identifying a plurality of segments of the spool file using the plurality of commands where each command identifies a unique segment of the spool file. Further, each of the segments of the spool file has attributes associated with it. The method may further comprise converting a segment of the spool file into a Portable Document Format (PDF) file. The method may further comprise determining an appropriate action to be performed on the PDF file using the attributes associated with the segment converted into the PDF file. The method may further comprise performing the appropriate action on the PDF file.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for performing multiple actions on a single spool file. In one embodiment of the present invention, a Portable Document Format (PDF) server (PDF server is a component of a print server) identifies segments or sub-documents of a spool file by identifying commands, e.g., Base Name Group (BNG) commands, in the data stream generated by an application. A BNG command may indicate the beginning of a segment or sub-document of a spool file. Upon identifying segments of the spool file, each segment may be converted into a PDF file by the PDF server. The PDF server may determine an action, e.g., electronic mailing, faxing, printing, to be performed on the PDF file by accessing a particular entry in a database using the attributes of the segment (referring to the segment that was converted into the PDF file) where the entry contains a command to perform a particular action. In another embodiment, the PDF server may determine an action, e.g., electronic mailing, faxing, printing, to be performed on the PDF file by calling a user program to supply the PDF server with the appropriate action to be performed on the PDF file. The user program may supply such an action by receiving the attributes of the segment from the PDF server. The user program may use the segment attributes to identify the action to be performed. In this manner, multiple actions, e.g., fax, e-mail, archive, print, may be performed on different segments of a spool file. That is, in this manner, multiple actions may be performed on a single spool file.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
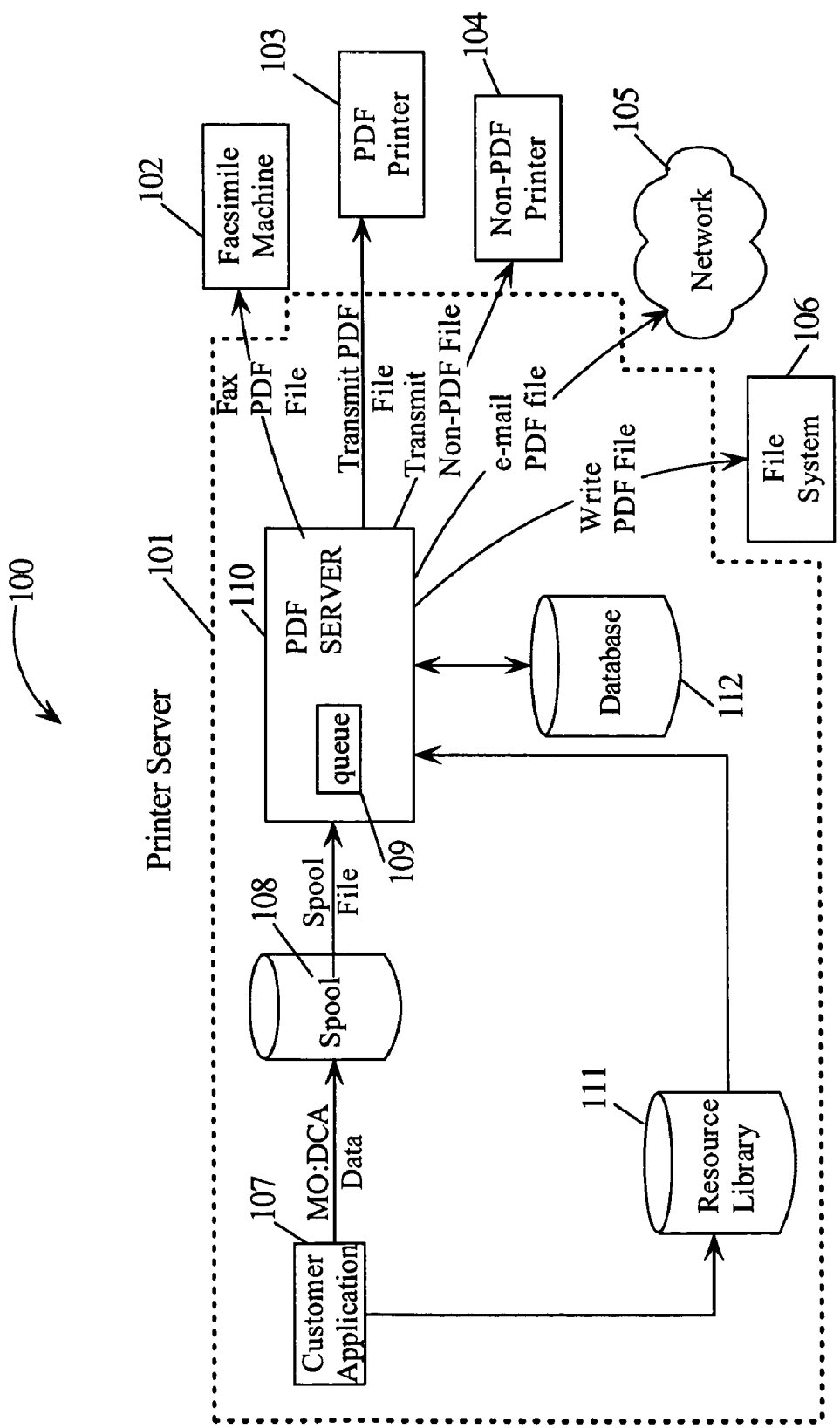
FIG. 1 illustrates an embodiment of the present invention of a presentation system.

FIG. 1—Presentation System

FIG. 1 illustrates one embodiment of a presentation system 100, such as an Advanced Function Presentation (AFP) system, used for practicing the present invention. Presentation system 100 may include a print server 101 configured to produce and distribute documents in any number of manners, e.g., faxing, electronic mailing, printing, etc., as discussed further below. Presentation system 100 may further include a facsimile machine 102, a Portable Document Format (PDF) compatible printer 103, a non-PDF printer 104, a network 105, e.g., local area network (LAN), wide area network (WAN) such as the Internet, and a file system 106 used to archive documents, such as in a PDF format. Each of these components may represent the different actions, e.g., faxing, electronic mailing, printing, archiving, to be performed on different segments or sub-documents of a single spool file as discussed further below. It is noted that presentation system 100 of FIG. 1 is illustrative and that presentation system 100 may include other components than indicated above that may be used to perform other actions on a spool file.

Referring to FIG. 1, print server 101 may include a customer application 107 configured to generate a data stream that is a formatted, platform and device independent logical description of a print document. One known specification of such a logical description of a data stream utilized for printing is known as Mixed Object Document Content Architecture (MO:DCA), described in detail in IBM Mixed Object Document Content Architecture Reference number SC31-6802 which is hereby incorporated by reference in its entirety. In one embodiment, customer application 107 may be an application located in a different system, e.g., client computer, apart from print server 101.

Print server 101 may further include a spool 108 for both receiving and spooling the data stream representing the print document from application 107. Spool 108 may be configured to spool the data stream into a file, referred to herein as a "spool file". The spool file may comprise two components, a data portion and an attribute portion. The data portion may include data objects, print control objects, logical page description, e-mail address, facsimile number. The data portion may further include commands such as a Begin Named Page Group (BNG) and an End Named Page Group (ENG) structured field pair. A BNG may indicate the beginning of a segment or a sub-document of a spool file and an ENG may indicate the ending of the segment or sub-document of the spool file. The attribute portion may include attributes used in the actual printing of the document, such as job name, output queue name, spool file name, user identification, form type, user data, etc. The attribute portion may further include what is referred to herein as "segment identifications". A segment identification is a unique identification associated with a particular segment of the spool file. In one embodiment, the segment identification may be part of the BNG command. Hence, the BNG command may indicate the beginning of a segment that is identified by the unique segment identification. It is noted that each segment of the spool file may have its own attributes (referred to herein as "segment attributes") which are identified by the segment identification. The segment attributes may include the attributes listed above as well as the segment identification that identifies the respective segment.

As will be discussed in greater detail below, the BNG may be used by print server 101 to identify segments or sub-documents of a spool file. Once print server 101 identifies a segment of a spool file, print server 101 may be configured to convert the segment into a Portable Document Format (PDF) file.

Referring to FIG. 1, the spool file may be enqueued in a queue 109 of a PDF server 110 by spool 108. In one embodiment, PDF server 110 may access a resource library 111 containing resources such as fonts and print-control objects that may be required to convert the data stream into PDF files as discussed below. In one embodiment, PDF server 110 may use resource library 111 to tie the logical page description of the print document to a physical medium. Application program 107 may be configured to access and use resource library 111 to format the document.

As stated in the Background Information section, it may be desirable to perform different actions on the data stream besides printing out the document in a hard copy format. It may further be desirable to perform different actions on different sub-documents in the single document. For example, it may be desirable to send one of the sub-documents electronically to the appropriate individual. In another example, it may be desirable to fax one of the sub-documents to the appropriate individual. Continuing with the telephone company example, one customer may prefer to receive the telephone bill by fax instead of by mail through the United States Postal Service®. Another customer may prefer to receive the telephone bill by e-mail instead of by mail through the United States Postal Service®. Therefore, there is a need in the art to perform multiple actions, e.g., fax, e-mail, archive, print, on a single spool file.

Multiple actions may be performed on a single spool file by segmenting the spool file using the BNG commands in the data stream as described above. Upon identifying the segments of the spool file, the segment may be converted into a PDF file. Upon converting the segment into a PDF file, an action, e.g., faxing, e-mailing, archiving, printing, may be performed on the PDF file as discussed below.

As stated above, spool 108 transmits the spool file to PDF server 110. In one embodiment, PDF server 110 may be configured to identify each segment of the spool file using the BNGs in the data stream. Upon identifying each segment, PDF server 110 may be configured to convert the segment into a PDF file. Upon converting the segment of the spool file into a PDF file, PDF server 110 may be configured to determine the appropriate action to perform, e.g., faxing, e-mailing, printing, archiving, on the PDF file by indexing into a particular entry in a database 112 configured to store actions to be performed on the segments of the spool file. In one embodiment, each entry in database 112 may be associated with a particular segment of the spool file that may be indexed using the attributes associated with that segment. As stated above, the segment attributes may include a segment identification which may be used to identify a particular segment. Since each segment may be identified by a unique segment identification, the segment identification, along with the other attributes of the segment, may be used to index into a unique entry in database 112. That entry may contain a command for PDF server 110 to perform a particular action, e.g., faxing, e-mailing, printing, archiving, on the PDF file (the PDF file that was converted from the segment associated with that entry).

In one embodiment, the entries of database 112 may be edited to indicate an appropriate action to be performed on a segment of the spool file by a user editing the database entries via an Application Programming Interface (API) call or via a command line interface.

In another embodiment, upon converting the segment of the spool file into a PDF file, PDF server 110 may be configured to determine the appropriate action to perform, e.g., faxing, e-mailing, printing, archiving, on the PDF file by calling a user program (not shown) to supply the appropriate action to be performed on the PDF file. In one embodiment, PDF server 110 may be configured to transmit the spool attributes to the user program which may be configured to determine the appropriate action to perform on the PDF file using these attributes. As stated above, the spool attributes may include a unique segment identification which may be used by the user program to identify a particular entry in a data structure associated with the segment. The entry in the data structure may include a command to perform a particular action. Upon identifying the action to be performed on the PDF file, the user program may instruct PDF server 110 to perform such an action on the PDF file. In this embodiment, the actions to be performed on the segments of the spool file may be dynamically updated.

Once PDF server 110 identifies the action to be performed on the PDF file, PDF server 110 performs the action. For example, PDF server 110 may fax the PDF file to an intended recipient, as identified in the data portion of the spool file associated with the segment, via fax machine 102. As stated above, the data portion of the spool file may include BNG commands which may be used to indicate segments or sub-documents of the spool file. Hence, PDF server 110 may identify the appropriate data associated with a particular segment. In another example, PDF server 110 may transmit the PDF file to a PDF compatible printer 103 to be printed out. In another example, PDF server 110 may re-spool the PDF file to be in a different format, e.g., Intelligent Printer Data Stream (IPDS), used by a printer 104 to print out the document. In another example, PDF sever 110 may e-mail the document to an intended recipient, as identified in the data portion of the spool file associated with the segment, via network 105, e.g., Internet. In another example, PDF sever 110 may archive the PDF file by transmitting the PDF file to file system 106 for storage.

It is noted that in one embodiment, customer application 107, spool 108, resource library 111 and database 112 may be located separately from print server 101. In such an embodiment, print server 101 may simply include PDF server 110. It is further noted that other variations, e.g., application 107 is located separate from pint server 101 but the other components are located within print server 101, are contemplated and are covered under different embodiments applying the principles of the present invention.

A more detail description of print server 101 is provided below in association with FIG. 2. A more detail description of print server 101 performing multiple actions, e.g., e-mail, fax, print, archive, on different segments of the same spool file is provided further below in association with FIG. 3.

Figure 2:
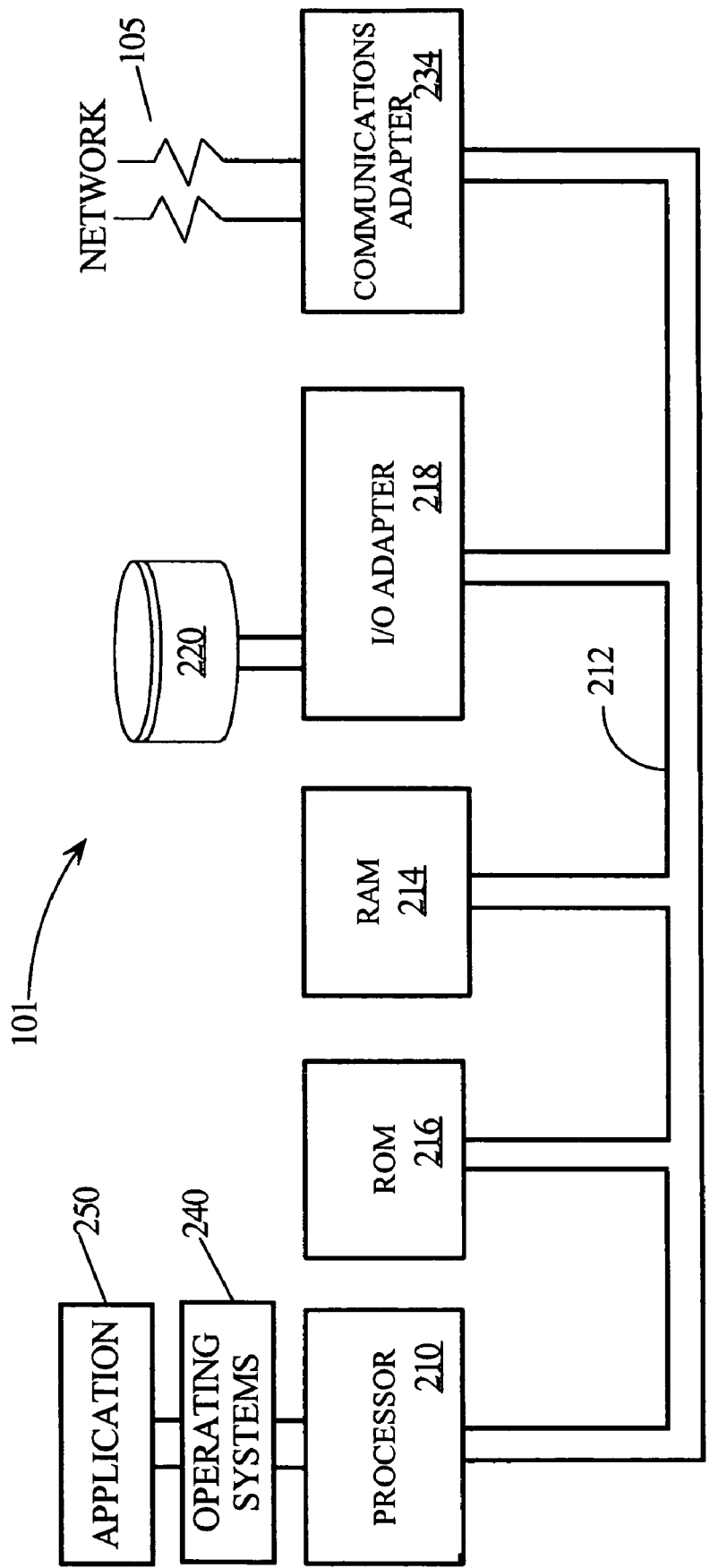
FIG. 2 illustrates an embodiment of the present invention of a print server of the present system.

FIG. 2—Print Server

FIG. 2 illustrates a typical hardware configuration of print server 101 (FIG. 1) which is representative of a hardware environment for practicing the present invention. Referring to FIG. 2, print server 101 may have a processor 210 coupled to various other components by system bus 212. An operating system 240 may run on processor 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250.

Figure 3A:
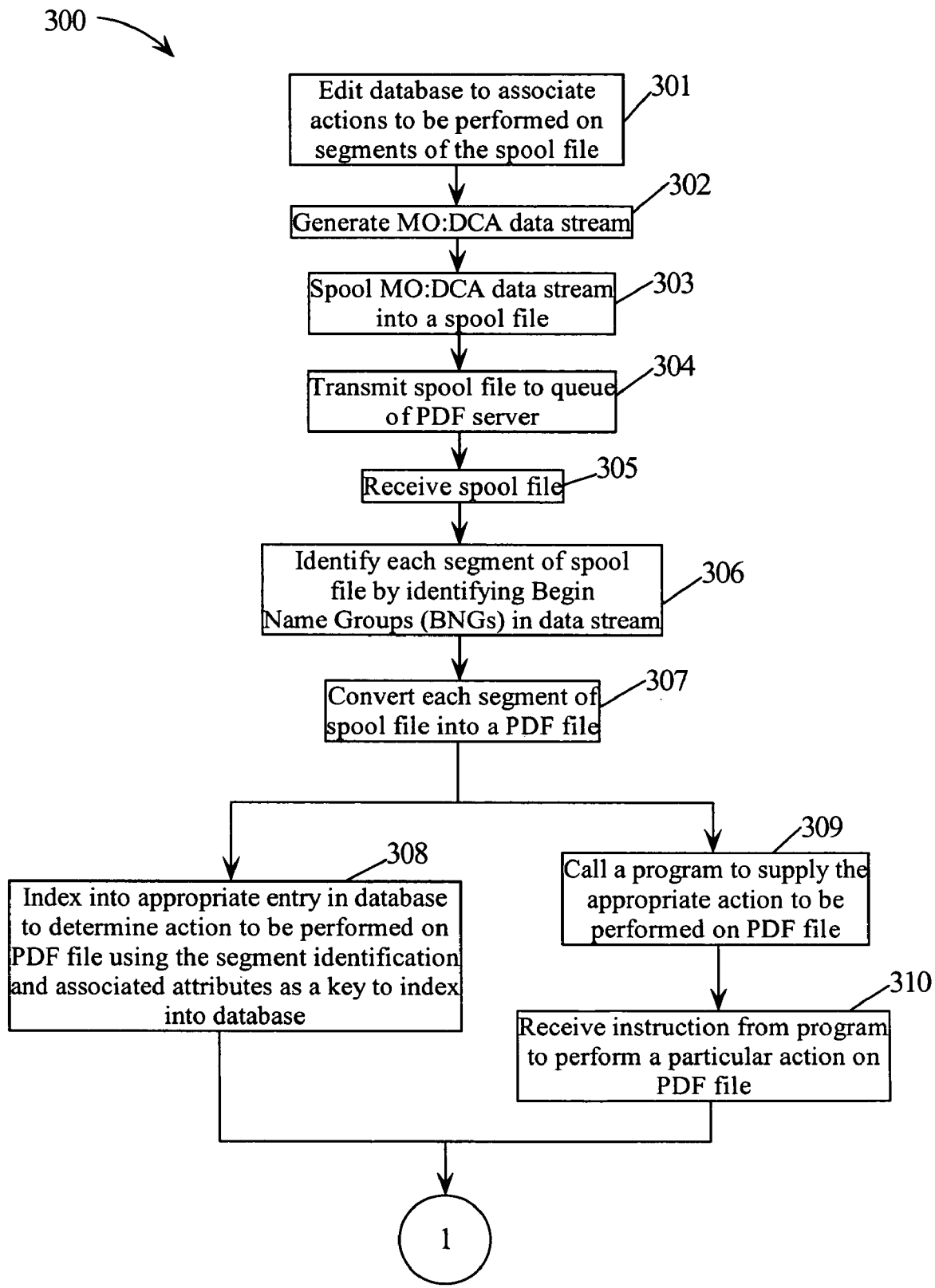
FIG. 3 is a flowchart of a method for performing multiple actions on a single spool file in accordance with an embodiment of the present invention.
Figure 3B:
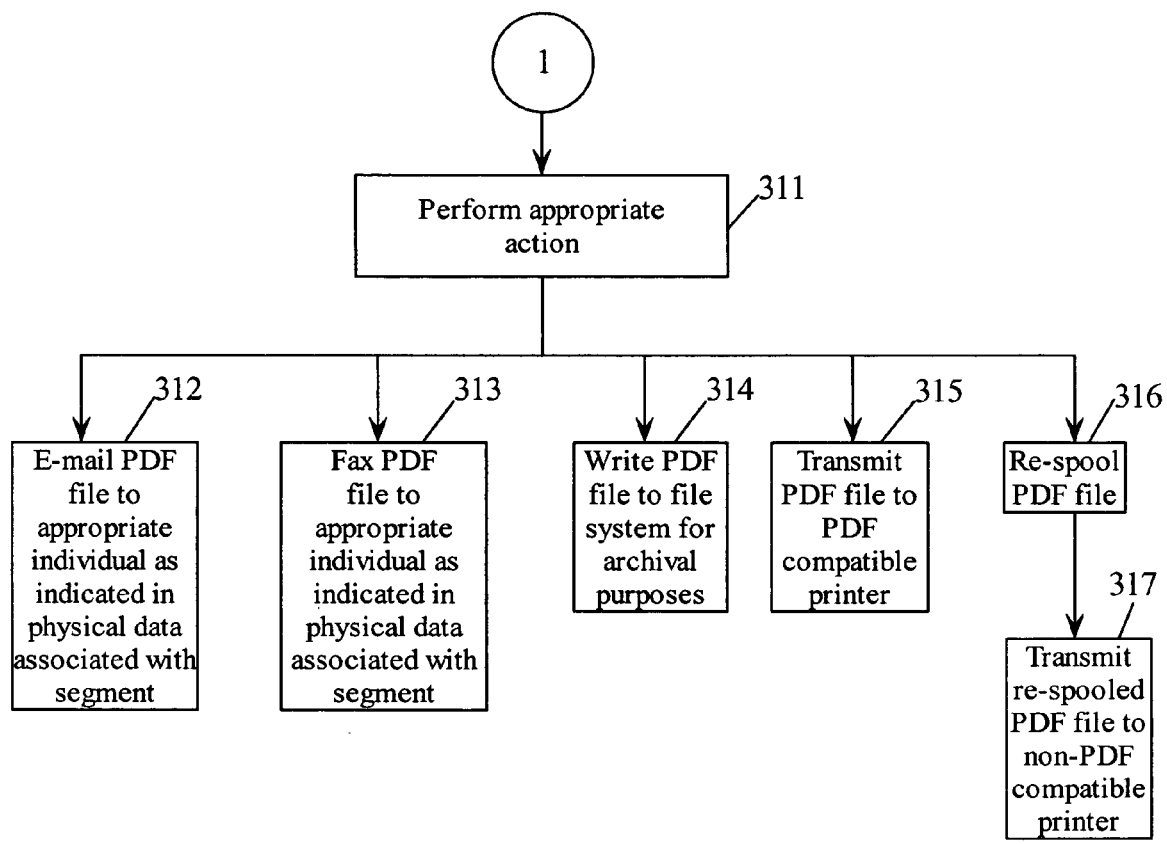

Application 250 may include, for example, customer application 107 (FIG. 1) configured to generate a data stream as described above. Application 250 may also include an application configured to perform multiple actions on a single spool file as discussed below in association with FIG. 3. FIG. 3 is a flowchart of a method for performing multiple actions, e.g., e-mail, fax, print, on different segments of the same spool file in accordance with an embodiment of the present invention. It is noted that in one embodiment, the code for the application for performing multiple actions on a single spool file may reside in both operating system 240 and application 250.

Referring to FIG. 2, Read-Only Memory (ROM) 216 may be coupled to system bus 212 and include a basic input/output system ("BIOS") that controls certain basic functions of print server 101. Random access memory (RAM) 214 and disk adapter 218 may also be coupled to system bus 212. It should be noted that software components including operating system 240 and application 250 may be loaded into RAM 214 which may be print server's 101 main memory for execution. Disk adapter 218 may be an integrated drive electronics ("IDE") adapter that communicates with a disk unit 220, e.g., disk drive. In one embodiment, database 112 (FIG. 1) configured to store actions to be performed on the segments of a spool file, as discussed above, may reside in disk unit 220. In one embodiment, the queue used to temporarily store a spool file from spool 108 (FIG. 1), as discussed above, may reside in disk unit 220. In one embodiment, spool 108 and resource library 111 (FIG. 1) may reside in disk unit 220. In one embodiment, PDF server 110 (FIG. 1) may reside in disk unit 220 or in application 250. It is noted that client application 107 may reside in disk unit 220 or in application 250. It is further noted that the application for performing multiple actions on a single spool file, as discussed below in association with FIG. 3, may reside in disk unit 220 or in application 250.

Referring to FIG. 1, print server 101 may further comprise a communications adapter 234 coupled to bus 212. Communications adapter 234 may interconnect bus 212 with an outside network 105 enabling print server 101 to electronically mail a PDF to an intended recipient as identified in the data associated with the segment of the spool file.

Implementations of the present invention include implementations as a system programmed to execute the method or methods described herein, and as a computer program product. According to the system implementations, sets of instructions for executing the method or methods may be resident in the random access memory 214 of one or more systems configured generally as described above. Until required by print server 101, the set of instructions may be stored as a computer program product in another memory, for example, in disk unit 220. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

A description of performing multiple actions on a single spool file using print server 101 (FIG. 2) in presentation system 100 (FIG. 1) is described below in association with FIG. 3.

FIG. 3—Method for Performing Multiple Actions on a Single Spool File

FIG. 3 is a flowchart of one embodiment of the present invention of a method 300 for performing multiple actions on a single spool file.

Referring to FIG. 3, in conjunction with FIGS. 1-2, in optional step 301, the entries in database 112 (database configured to store actions to be performed on the segments of the spool file) are edited to associate a particular action to be performed on a particular segment of the spool file. In one embodiment, step 301 is not implemented by method 300 but instead a call is made to a user program to obtain the action to be performed on a segment of the spool file as discussed further below.

In step 302, application 107 generates a data stream that is a formatted, platform and device independent logical description of a print document. In one embodiment, the data stream is a MO:DCA data stream.

In step 303, spool 108 spools the generated data stream into a spool file. In step 304, spool 108 transmits the spool file to a queue of PDF server 110.

In step 305, PDF server 110 receives the spool file. In step 306, PDF server 110 identifies each segment of the spool file by identifying each BNG in the data portion of the spool file that indicates the beginning of each segment of the spool file.

Upon identifying each segment of the spool file, PDF server 110, in step 307, converts each segment of the spool file into a PDF file. Upon converting a segment of the spool file into a PDF file, PDF server 110 performs the following steps for each PDF file.

In step 308, PDF server 110 indexes into an appropriate entry in database 112 using the segment attributes for the segment converted into a PDF file, as described above, to obtain the action to be performed on the PDF file. In one embodiment, an entry in database 112 may be indexed using the segment attributes (function as a key) which includes a unique segment identification. That entry may contain a command for PDF server 110 to perform a particular action, e.g., faxing, e-mailing, printing, archiving, on the PDF file (the PDF file that was converted from the segment associated with that entry).

Alternatively, in step 308, PDF server 110 calls a user program to supply the appropriate action to be performed on the converted PDF file. In one embodiment, PDF server 110 may be configured to transmit the spool attributes to the user program which may be configured to determine the appropriate action to perform on the PDF file using these attributes. As stated above, the spool attributes may include a unique segment identification which may be used by the user program to identify a particular entry in a data structure associated with segment. The entry in the data structure may include a command to perform a particular action. Upon identifying the action to be performed on the PDF file, the user program, in step 309, instructs PDF server 110 to perform such an action on the PDF file.

In step 310, upon identifying the action to be performed on the PDF file, PDF server 110 performs the appropriate action on the PDF file in step 311.

In step 312, PDF server 110 electronically mails the PDF file via network 105 to the intended recipient as identified in the data portion associated with the segment converted into the PDF file.

Alternatively, in step 313, PDF server 110 faxes the PDF file via facsimile machine 102 to the intended recipient as identified in the data portion associated with the segment converted into the PDF file.

Alternatively, in step 314, PDF server 110 writes the PDF file to file system 106 for archival purposes.

Alternatively, in step 315, PDF server 110 transmits the PDF file to a PDF compatible printer 103 to print out the PDF file.

Alternatively, in step 316, PDF server 110 re-spools the PDF file into a different format, e.g., Intelligent Printer Data Stream (IPDS). In step 317, PDF server 110 transmits the re-spooled document to non-PDF compatible printer 104 to print out the document.

It is noted that method 300 may include other and/or additional steps that, for clarity, are not depicted. It is further noted that method 300 may be executed in a different order presented and that the order presented in the discussion of FIG. 3 is illustrative. It is further noted that certain steps in method 300 may be executed in a substantially simultaneous manner.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A computer implemented method for presenting sub-documents of a data stream on multiple types of presentation devices, the method comprising:
   receiving the data stream from a single spool file that includes a single document, the document comprising a plurality of sub-documents, each sub-document including associated attributes identifying an action to perform on the sub-document, wherein the action for at least one sub-document is different than the action for another sub-document;
   identifying a first sub-document of the data stream and a first action to perform on the first sub-document based on first attributes of the first sub-document;
   printing the first sub-document if the first action indicates printing of the first sub-document;
   transmitting the first sub-document in an electronic format if the first action indicates transmission of the first sub-document in the electronic format;
   identifying a second sub-document of the data stream and a second action to perform on the second sub-document based on second attributes of the second sub-document, wherein the second action is different than the first action;
   printing the second sub-document if the second action indicates printing of the second sub-document; and
   transmitting the second sub-document in an electronic format if the second action indicates transmission of the second sub-document in the electronic format.

2. The method of claim 1, wherein the electronic format comprises one or more of the following: faxing, electronic-mailing or archiving the first sub-document.

3. The method of claim 1, wherein transmitting the first sub-document in the electronic format further comprises:
   faxing the first sub-document if the first action indicates faxing of the first sub-document;
   electronically mailing the first sub-document if the first action indicates electronic mailing of the first sub-document; and
   writing the first sub-document to a file system if the first action indicates archiving of the first sub-document.

4. The method of claim 1 further comprising:
   converting the first sub-document to a first device specific data stream for a first device used to print or transmit the first sub-document; and
   converting the second sub-document to a second device specific data stream for a second device used to print or transmit the second sub-document.

5. The method of claim 1, wherein the associated attributes of each sub-document include a segment identification used as an index for an entry in a database, and an action to perform on each sub-document is determined based on information in the entry in the database.

6. The method of claim 5 further comprising:
   editing the entry for each sub-document to indicate the action to perform on each sub-document.

7. The method of claim 1, further comprising:
   calling a user program to determine an action to perform on each sub-document of the data stream based on associated attributes of each sub-document.

8. The method of claim 1, wherein the data stream comprises a Mixed Object Document Content Architecture (MO:DCA) data stream.

9. The method of claim 1, wherein the associated attributes comprise a Begin Name Group (BNG) identifying a beginning of each sub-document of the data stream.

10. The method of claim 1 further comprising:
    generating the data stream; and
    inserting the associated attributes into the data stream.

11. A computer program product comprising a computer useable medium including a computer readable program for presenting sub-documents of a data stream on multiple types of presentation devices, wherein the computer readable program when executed on a computer causes the computer to:
    receive the data stream from a single spool file that includes a single document, the document comprising a plurality of sub-documents, each sub-document including associated attributes identifying an action to perform on the sub-document, wherein the action for at least one sub-document is different than the action for another sub-document;
    identify a first sub-document of the data stream and a first action to perform on the first sub-document based on first attributes of the first sub-document;
    print the first sub-document if the first action indicates printing of the first sub-document;
    transmit the first sub-document in an electronic format if the first action indicates transmission of the first sub-document in the electronic format;
    identify a second sub-document of the data stream and a second action to perform on the second sub-document based on second attributes of the second sub-document, wherein the second action is different than the first action;
    print the second sub-document if the second action indicates printing of the second sub-document; and transmit the second sub-document in an electronic format if the second action indicates transmission of the second sub-document in the electronic format.

12. The computer program product of claim 11, wherein the electronic format comprises one or more of the following: faxing, electronic-mailing or archiving the first sub-document.

13. The computer program product of claim 12 further causing the computer to:
fax the first sub-document if the first action indicates faxing of the first sub-document;
electronically mail the first sub-document if the first action indicates electronic mailing of the first sub-document; and
write the first sub-document to a file system if the first action indicates archiving of the first sub-document.

14. The computer program product of claim 11 further causing the computer to:
convert the first sub-document to a first device specific data stream for a first device used to print or transmit the first sub-document; and
convert the second sub-document to a second device specific data stream for a second device used to print or transmit the second sub-document.

15. The computer program product of claim 11, wherein the associated attributes of each sub-document include a segment identification used as an index for an entry in a database, and an action to perform on each sub-document is determined based on information in the entry in the database.

16. The computer program product of claim 15 further causing the computer to:
edit the entry for each sub-document to indicate the action to perform on each sub-document.

17. The computer program product of claim 11 further causing the computer to:
call a user program to determine an action to perform on each sub-document of the data stream based on associated attributes of each sub-document.

18. The computer program product of claim 11, wherein the data stream comprises a Mixed Object Document Content Architecture (MO:DCA) data stream.

19. The computer program product of claim 11, wherein the associated attributes comprise a Begin Name Group (BNG) identifying a beginning of each sub-document of the data stream.

20. The computer program product of claim 11 further causing the computer to:
generate the data stream; and
insert the associated attributes into the data stream.

21. A system for presenting sub-documents of a data stream on multiple types of presentation devices, the system comprising:
a processor; and
a memory unit coupled to the processor, wherein the memory unit is operable for storing a computer program, and
wherein the processor, responsive to the computer program is adapted to:
receive the data stream from a single spool file that includes a single document, the document comprising a plurality of sub-documents, each sub-document including associated attributes identifying an action to perform on the sub-document, wherein the action for at least one sub-document is different than the action for another sub-document;
identify a first sub-document of the data stream and a first action to perform on the first sub-document based on first attributes of the first sub-document;
print the first sub-document if the first action indicates printing of the first sub-document;
transmit the first sub-document in an electronic format if the first action indicates transmission of the first sub-document in the electronic format;
identify a second sub-document of the data stream and a second action to perform on the second sub-document based on second attributes of the second sub-document, wherein the second action is different than the first action;
print the second sub-document if the second action indicates printing of the second sub-document; and
transmit the second sub-document in an electronic format if the second action indicates transmission of the second sub-document in the electronic format.

22. The system of claim 21, wherein the electronic format comprises one or more of the following: faxing, electronic-mailing or archiving the first sub-document.

23. The system of claim 22, wherein the processor is further adapted to:
fax the first sub-document if the first action indicates faxing of the first sub-document;
electronically mail the first sub-document if the first action indicates electronic mailing of the first sub-document; and
write the first sub-document to a file system if the first action indicates archiving of the first sub-document.

24. The system of claim 21, wherein the processor is further adapted to:
convert the first sub-document to a first device specific data stream for a first device used to print or transmit the first sub-document; and
convert the second sub-document to a second device specific data stream for a second device used to print or transmit the second sub-document.

25. The system of claim 21, wherein the associated attributes of each sub-document include a segment identification used as an index for an entry in a database, and the processor is adapted to determine an action to perform on each sub-document based on information in the entry in the database.

26. The system of claim 25, wherein the processor is further adapted to:
edit the entry for each sub-document to indicate the action to perform on each sub-document.

27. The system of claim 21, wherein the processor is further adapted to:
call a user program to determine an action to perform on each sub-document of the data stream based on associated attributes of each sub-document.

28. The system of claim 21, wherein the data stream comprises a Mixed Object Document Content Architecture (MO:DCA) data stream.

29. The system of claim 21, wherein the associated attributes comprise a Begin Name Group (BNG) identifying a beginning of each sub-document of the data stream.

30. The system of claim 21, wherein the processor is further adapted to:
generate the data stream; and
insert the associated attributes into the data stream.

* * * * *